United States Patent Office 3,817,714
Patented June 18, 1974

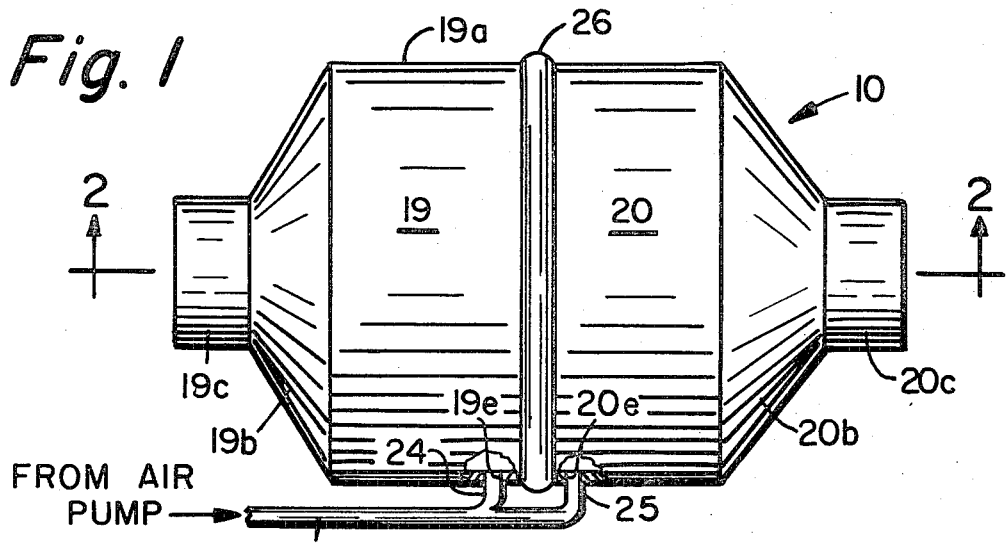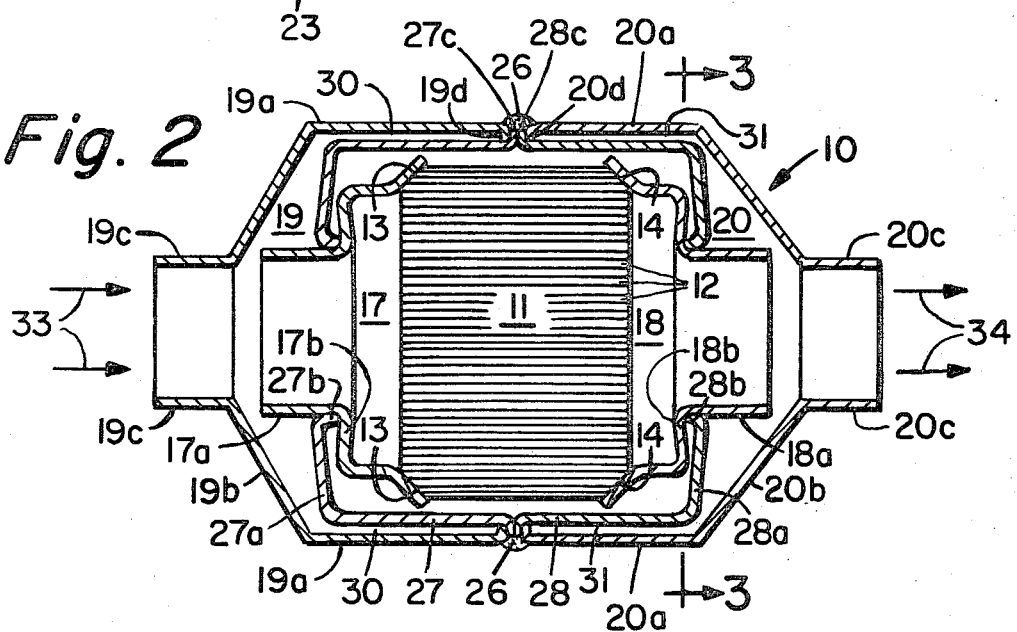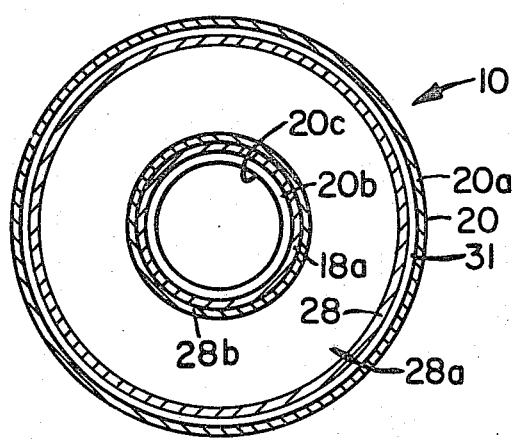

3,817,714
CATALYTIC CONVERTER
Robert F. Wiley, Corning, N.Y., assignor to Corning Glass Works, Corning, N.Y.
Filed Oct. 10, 1972, Ser. No. 296,065
Int. Cl. F01n 3/14; B01f 9/04
U.S. Cl. 23—288 F
4 Claims

ABSTRACT OF THE DISCLOSURE

A catalytic oxidation converter to be used in exhaust systems of internal combustion engines for emission control purposes. The converter comprises an assembly including pairs of circular and generally frusto-conical or funnel shaped and concentric metal members, housings, or casings forming a container circumferentially surrounding a cylindrical honeycomb core catalytic member of a material having high temperature durability and a low coefficient of thermal expansion, such as a refractory ceramic material, and the container is designed to compensate for the differences in thermal expansion of the material of the converter and the metal material of the assembly of the housings or casings of the container. Annular spaces are provided between each of said pairs of housings or casings and means are provided for supplying a flow of air or other suitable oxygen containing gas to said annular spaces in regions thereof adjacent the center of the converter to aid in cooling said housings or casings while supplying oxygen necessary for the catalytic oxidation of exhaust gases from an internal combustion engine as they pass through the core member of the converter.

BACKGROUND OF THE INVENTION

Catalytic oxidation converters to be used for exhaust gas emission control purposes are now relatively well-known in the art. For example, there is disclosed in my co-pending application, Ser. No. 255,020, filed May 19, 1972, for Catalytic Converter and assigned to the same assignee as the present application, a catalytic oxidation converter to be used for said control purposes. There is disclosed in United States Pat. 3,441,381, issued Apr. 29, 1969 to C. D. Keith et al. a catalytic oxidation converter including apparatus for supplying and mixing air with exhaust gases from an internal combustion engine, such air being so supplied to a conduit of the exhaust gas system of an automotive vehicle prior to said exhaust gases entering said catalytic converter. Copending application, Ser. No. 296,064, entitled Catalytic Converter, and filed by William C. Bigler on the same date and assigned to the same assignee as the present application, discloses a catalytic oxidation converter somewhat similar to but patentably different from the disclosed herein.

While refractory ceramic core members for catalytic converters have been developed to the point where they perform substantially satisfactorily, such core members embody a honeycomb of very small passages or channels with relatively thin walls and the ceramic material of the core members is a relatively brittle material. For this reason the members must be mounted in their casings or containers so that they are always securely held and do not become loose at any time so as to shake about in the casings or containers and thereby become broken up, cracked, chipped or otherwise fractured. Differences in the coefficients of thermal expansion of the ceramic materials of the core members and the metal materials of the containers or casings for such members impose the problem of mounting the core members within the containers or casings in a manner to compensate for said differences in expansion and thereby prevent said fracturing, chipping or breaking up of the core members by their shaking about in their casings or containers. Many of the containers or casings that have been heretofore developed for the purposes of solving said problem have heretofore been either relatively elaborate or complex and, therefore, uneconomical, or have not been sufficiently durable for the satisfactory solution of the fracturing problem. The present invention was, therefore, developed to provide catalytic converters of the type mentioned including relatively economical and generally otherwise satisfactory and relatively durable casings or containers for the core members of the catalytic oxidation converters.

It is also pointed out that catalytic converters of the types shown in the above-cited patent application and the above-cited patent have outer housings or casings which may, at times, reach temperatures of 1100° F. or greater during the passage of exhaust gases from an internal combustion engine through the core members of the converters. Therefore, for various reasons, including the aforementioned differences in coefficient of thermal expansion of the castings or housings of the converters and that of the core members of the converters, as well as for reasons of safety, means have been sought to keep said casings or housing of said converters at the lowest temperature possible during operation thereof. Accordingly, the catalytic converter and associated apparatus of the present invention was developed to aid in keeping said housings or casings at said lowest temperature possible and, in connection therewith, supplying heated air to exhaust gases entering the converter for the catalytic oxidation operation of the converter.

Other objects and characteristic features of the invention will become apparent as the description proceeds.

SUMMARY OF THE INVENTION

The invention is believed to be adequately summarized in the foregoing abstract of the disclosure and, therefore, for the purposes of brevity and to prevent redundancy, no further brief summary of the invention will be given nor is considered necessary.

BRIEF DESCRIPTION OF THE DRAWINGS

In the drawings:

FIG. 1 is a side elevational view of the catalytic oxidation converter and apparatus embodying the invention;

FIG. 2 is a cross-sectional view of the converter of FIG. 1, such view being taken generally along line 2—2 of FIG. 1; and FIG. 3 is another cross-sectional view of the converter of FIGS. 1 and 2, such view being taken generally along line 3—3 of FIG. 2.

Similar reference characters refer to similar parts in each of the FIGS. of the drawings.

PREFERRED EMBODIMENTS OF THE INVENTION

Referring to the drawings in detail, there is shown in FIGS. 1, 2 and 3 a catalytic converter 10 comprising a cylindrical honeycomb body or core member 11 of a refractory ceramic material having a myriad of relatively minute passages such as 12 extending therethrough from one planar end of the core member or honeycomb body to the other. The brims 13 and 14 of the honeycomb body or core member 11 are evenly beveled or chamfered as illustrated in FIG. 2 and the outer periphery of member 11 between said beveled brims 13 and 14 is preferably provided with a substantially hermetic band which may, for example, be of the same refractory ceramic material as the core member 11 itself.

Core member or honeycomb body 11 may, for example, be made by the method disclosed in United States Pat. No. 3,246,972, issued Apr. 19, 1966 to Gail P. Smith, and reference is made to lines 52 through 75 of column 4 and lines 1 through 73 of column 5 of such patent if a specific example of one method of making the honeycomb body 11 is desired. Reference is also made to my copending application S.N. 280,508, filed Aug. 14, 1972 and entitled Extrusion Die and Method of Making Same, such application being assigned to the same assignee as the present application. Said copending application covers an extrusion die which can be expeditiously used in conjunction with the method covered by the cited patent to G. P. Smith to form refractory ceramic core members or honeycomb bodies such as 11 of the present application. Following the making of the honeycomb body or core member 11 per se, the walls of the passages such as 12 extending through the body or core member have an oxidation catalyst deposited thereon, such catalysts and methods of deposition thereof being well known in the art. In this connection reference is made to the afore-cited United States Pat. 3,441,381, issued Apr. 29, 1969 to C. D. Keith et al.

Referring further to FIG. 2, there is provided first and second somewhat funnel shaped and identical metallic inner casings 17 and 18, respectively, each having a large open end of a diameter slightly greater than the diameter of core member 11 and each tapering from said large open ends for a distance and at angles generally conforming or corresponding to the angles of the beveled brims or chamfers 13 and 14 of body or core member 11. Casings 17 and 18 are preferably made of a stainless steel material in order to provide relatively smooth surfaces for the casings, and because of the relatively high oxidation resistance properties and relatively low coefficient of thermal expansion of such a metallic material. The large open ends of casings 17 and 18, following the above-mentioned tapering thereof, join with annular bottom portions 17b, and 18b respectively, which in turn join with small circularly cylindrical ends 17a and 18a, respectively.

Casings 17 and 18 are disposed oppositely each other and core member or body 11 is positioned between said casings with the brims or chamfers 13 and 14 of the core member in firm contact with the inner surfaces of the tapering large ends of casings 17 and 18, respectively, adjacent said large open ends thereof. There is also provided first and second metallic outer casings 19 and 20, each of which comprises a cylindrical portion (19a and 20a, respectively) and funnel shaped end portions 19b and 20b, respectively. The large ends of end portions 19b and 20b taper to small cylindrical ends 19c and 20c, respectively, which form inlet and outlet conduits for exhaust gases as hereinafter further discussed. Casings 19 and 20 surround and enclose inner casings 17 and 18 with the inner ends of said small cylindrical ends 19c and 20c being disposed adjacent to but spaced from the outer or free ends of said small cylindrical ends 17a and 18a, respectively, of casings 17 and 18 respectively. Casings 19 and 20 are preferably made of a stainless steel material which has, for example, a coefficient of thermal expansion of about half that of the stainless steel material of casings 17 and 18.

Casings 17 and, thereby, the left-hand end of core member 11 (viewing FIG. 2) is supported and partially enclosed by a cylindrical support member 27 of a smaller outer diameter than the inner diameter of cylindrical portion 19a of casings 19, such support member 27 including a normally relatively flat annular end portion 27a having a hole in the center thereof through which small end 17a of casings 17 snugly extends. The perimeter of such hole is defined by a slightly inwardly extending wall portion 27b so that said end portion 17a of casing 17, when forcibly projected through said hole, is clamped and held about the periphery thereof by said wall portion as will be readily apparent to those skilled in the art from a brief glance at FIG. 2 of the drawings. The opposite or large end of support member 27 flares abruptly radially outwardly to form a circumferential flange portion 27c which is cooperative with an inwardly extending circumferential flange portion 19d provided about the large open end of cylindrical portion 19a of casing 19, the outer surface of said flange portion 19d bearing against the under surface of said flange portion 27c of support member 27 as mentioned further hereinafter.

Casings 18 and, thereby, the right-hand end of core member 11 (viewing FIG. 2) is supported and partially enclosed by a cylindrical support member 28 which is a mirror image of above described support member 27 and includes portions 28a, 28b and 28c corresponding to portions 27a, 27b and 27c, respectively, of support member 27. Flange portion 28c and a flange portion 20d provided on the large open end of cylindrical portion 20a of casing 20 are disposed in cooperative relationship with each other in a manner similar to that (mirror image) described above in conjunction with portions 19d and 27c of casing 19 and support member 27, respectively, as also further mentioned hereinafter. Portion 28b of support member 28 clamps portions 18a of casing 18 in a manner similar to that described above for portion 27b of support member 27.

Following the above-mentioned opposite disposition or positioning of casings 17 and 18 and core member 11 with the beveled brims or chamfers 13 and 14 of the core members in firm contact with the inner surfaces of the large ends of casings 17 and 18 where such ends taper or slope inwardly as previously described, support members 27 and 28 are disposed over cylindrical end portions 17a and 18a of said casings 17 and 18, respectively, as discussed above and with the outer surfaces of flange portions 27c and 28c forced into contact with each other to place core member 11 under compression at least in the regions of the brims 13 and 14 thereof. Casings 19 and 20 are then slid over support members 27 and 28, respectively, until the surfaces of the complimental pairs of flange portions 19d and 27c, and 20d and 28c of said casings and support members contact each other in the manner also described above. Casings 19 and 20 and their associated support members 27 and 28, respectively, are then forcibly moved toward each other until flange portions 27c and 28c of members 27 and 28 contact each other. Such forced movement causes annular bottom portions 17b and 18b of casings 17 and 18 to be somewhat deformed and become slightly inwardly concave and annular bottom portions 27a and 28a of members 27 and 28 to be somewhat deformed and become slightly outwardly convex as illustrated in FIG. 2 the drawings. Such deformations of said portions 17b, 18b, 27a and 28a places core member 11 under additional compression, such portions at such time acting in a manner similar to the well known Belleville spring washer action.

Following the above disposition of the assembled converter or converter assembly, casings 19 and 20 and their associated support members 27 and 28, respectively, are then secured or fastened to each other as by a weld such as 26 extending peripherally around the assembled converter 10 and preferably of an hermetic or air tight nature. It is pointed out that, by the type of converter assembly described, the associated pairs of support members and casings 19 and 27, and 20 and 28 in effect provide an integrant outer casing having hollow cylindrical walls embodying annular spaces such as 30 and 31 extending about the outer periphery of core member 11 with each such space becoming larger in regions where they also surround cylindrical portions 17a and 18a of inner casings 17 and 18, respectively.

Referring to FIG. 1, there is shown a fluid of air conduct 23, a first end of which is shown as receiving air from a source thereof such as an air pump and whose second end divides into two branch conduits 24 and 25 with the ends of such branch conduits extending through suitable orifices, such as 19e and 20e provided in portions 19a and 20a, respectively, of casings 19 and 20, and the openings in the ends of said branch conduits 24 and 25 connecting with the aforesaid spaces 30 and 31, respectively, surrounding core member 11 and casings 17 and 18. Connections of the ends of the branch conduits 24 and 25 are made in any suitable manner, such as by welding such ends to portions 19a and 20a of outer casings 19 and 20 for example, or by using suitable pipe connections if considered expedient and desirable to do so. In any event, said connections are, of course, made hermetic or air tight. The above mentioned air pump is omitted from the drawings for purposes of simplification thereof but the arrangement discussed will be readily apparent to those skilled in the art. The first end of conduit 23 may, alternatively, be connected to other sources of air such as an air scoop or a container of compressed air etc. or to a source of other suitable oxygen containing gas, if it is found expedient or convenient to do so.

In use the catalytic converter of the invention is connected to the exhaust system of an internal combustion engine so that the exhaust gases or emissions from such engine flow through core member 11 in a selected direction such as, for example, into exhaust gas inlet conduit 19c (small end of casing 19) in the right-hand direction (viewing FIG. 2) as indicated by the arrows such as 33. Such gases then flow through portion 17a of casing 17 and core member or body 11, portion 18a of casing 18, and out of the converter through exhaust gas outlet conduit 20c as indicated by the arrows such as 34.

When the above mentioned internal combustion engine is operating, the previously mentioned air pump is also turned on to supply a flow of air to said conduit 23 or a flow of air is supplied to such conduit from another suitable source such as previously mentioned. Such air flows through branch conduits 24 and 25 into the above mentioned spaces 30 and 31 and through such spaces in the left and right hand directions respectively (viewing FIG. 2). The air flowing in space 30 flows between the free end of portion 17a of casing 17 and portion 19b of casing 19 to join with the exhaust gases, flowing through exhaust gas inlet conduit 19c from said internal combustion engine, to mix and flow therewith. The air flowing through space 31 flows between the free end of portion 18a of casing 18 and portion 20b of casing 20 to join with the exhaust gases flowing through exhaust gas outlet or portion 20c of casing 20 and out of the converter. The passage of said flow of air through each of said spaces 30 and 31 is intended to cool casings 19 and 20 to the extent possible, that is, to maintain said casings at the lowest temperature possible. Furthermore, the air flowing through space 30 becomes heated during its passage through such space and is mixed with the exhaust gases as mentioned above to provide the oxygen or additional oxygen necessary for the catalytic oxidation operation of converter 10. Thus, the air supplied to spaces 30 and 31 of the converter provides the function of so-called cooling of the outer casings of the converter as well as the air flowing through space 30 supplying oxygen necessary for said catalytic oxidation operation.

Although there is herein shown and described in detail only one form of catalytic oxidation converter embodying the invention, it will be understood that various changes and modifications may be made therein within the purview of the appended claims without departing from the spirit and scope thereof.

I claim:

1. A catalytic converter for engine exhaust gases comprising, in combination;

(A) a cylindrical core member of a refractory ceramic material having a myriad of passages extending therethrough from one planar end thereof to the other, the brims of said planar ends being evenly beveled or chamfered and the walls of said passages having an oxidation catalyst deposited thereon;

(B) first and second oppositely disposed and generally funnel shaped metallic inner casings whose large open ends have a diameter slightly greater than the diameter of said core member and which taper at angles generally conforming to said beveled brims of the planar ends of the core member and whose small ends have a cylindrical end portion integral therewith, said large open ends of said first and second casings surrounding and in firm compressional contact with the beveled brims of the first and second planar ends respectively of the core member; and (C) first and second oppositely disposed cylindrical and hollow metallic support members having a larger diameter than said large ends of said first and second inner casings and each surrounding such end of a respectively associated one of the inner casings and part of said core member with an annular space therebetween, and such support members each having radially inwardly extending, forcibly outwardly convexed end portion embodying a hole in the center thereof through which the cylindrical end portion of the respectively associated inner casing extends with the perimeter of the respective hole tightly clamping about the outer periphery of the respective cylindrical end portion adjacent the junction of said cylindrical end portion and a forcibly inwardly concaved bottom portion of the large end of the respective inner casing;

(D) first and second oppositely disposed outer casings respectively associated with said first and second inner casings and said first and second support members, each such outer casing comprising a large cylindrical end portion having a larger diameter than said support members and a funnel portion including a small cylindrical end portion and a frusto-conical central portion whose large end joins one end of said large cylindrical end portion of the respective outer casing and each said large cylindrical end portion surrounding its said associated support member with an annular space remaining therebetween;

(E) means hermetically joining the large ends of said outer casings and said support members with each other to provide a fluid tight integrant outer casing embodying first and second annular spaces each surrounding part of said core member and the associated one of said inner casings with space remaining between the cylindrical end portion of the respective inner casing and the inner end of the small cylindrical end portion of the funnel portion of the respective outer casing with such small cylindrical end portions of the first and second outer casings forming inlet and outlet conduits for exhaust gases from an internal combustion engine, said joining means maintaining said firm compressional contact between said inner casings and said beveled brims of said core member and providing the forces to forcibly outwardly convex said support member end portions and to forcibly inwardly concave said large end bottom portions of said inner casings; and (F) means for supplying a flow of an oxygen containing gas, suitable for the catalytic oxidation operation of the converter, into each of said first and second annular spaces and through such spaces to the inner ends of said inlet and outlet conduits respectively.

2. A converter in accordance with claim 1 and in which said means for supplying said flow of gas comprises an air pump and associated fluid conduits in fluid-flow communication with said annular spaces.

3. A converter in accordance with claim 1 and in which said means for supplying said flow of gas comprises a fluid conduit having a first end connected with a supply of said gas and a second end including first and second branch conduits in fluid-flow communication with said first and second annular spaces, respectively.

4. A converter in accordance with claim 3 and in which said supply of said gas is an air pump.

(References on following page)

References Cited

UNITED STATES PATENTS

| | | | |
|---|---|---|---|
| 1,789,812 | 1/1931 | Frazer | 23—188 F-UX |
| 3,248,188 | 4/1966 | Chute | 23—288 F-UX |
| 3,381,774 | 5/1968 | Stade et al. | 181—59 |
| 3,435,613 | 4/1969 | Bannarino et al. | 160—298 X |
| 3,441,381 | 4/1969 | Keith et al. | 23—288 F |
| 3,441,382 | 4/1969 | Keith et al. | 23—288 F |
| 3,597,165 | 8/1971 | Keith et al. | 23—288 F |
| 3,656,915 | 4/1972 | Tourtellotte | 23—288 F |
| 3,692,497 | 9/1972 | Keith et al. | 23—288 F |
| 3,754,870 | 8/1973 | Carnahan et al. | 23—288 F |

FOREIGN PATENTS

| | | | |
|---|---|---|---|
| 2,256,669 | 9/1969 | Japan | 60—298 |
| 2,837,730 | 10/1970 | U.S.S.R. | 60—298 |

BARRY S. RICHMAN, Primary Examiner

U.S. Cl. X.R.

23—288 K; 60—295, 298, 299